United States Patent [19]

Traw et al.

[11] Patent Number: 5,949,877
[45] Date of Patent: Sep. 7, 1999

[54] CONTENT PROTECTION FOR TRANSMISSION SYSTEMS

[75] Inventors: Chandler Brendan Stanton Traw; David Wayne Aucsmith, both of Portland, Oreg.

[73] Assignee: Intel Corporation, Santa Clara, Calif.

[21] Appl. No.: 08/791,245

[22] Filed: Jan. 30, 1997

[51] Int. Cl.$^6$ .............................. H04L 9/00; H04K 1/00
[52] U.S. Cl. ........................... 380/4; 380/25; 380/30
[58] Field of Search ........................ 380/30, 4, 21

[56] References Cited

U.S. PATENT DOCUMENTS

| | | | |
|---|---|---|---|
| 5,631,961 | 5/1997 | Mills et al. | 380/21 |
| 5,724,425 | 3/1998 | Chang | 380/25 |
| 5,751,805 | 5/1998 | Yokohama et al. | 380/4 |
| 5,825,876 | 10/1998 | Peterson, Jr. | 380/4 |

OTHER PUBLICATIONS

Aviel D. Rubin, "Trusted Distribution of Software Over the Internet," IEEE Network and Distribution System Security, pp. 47–53, Apr. 1995.

*Primary Examiner*—Eric W. Stamber
*Assistant Examiner*—Justin T. Darrow
*Attorney, Agent, or Firm*—Blakley, Sokoloff, Taylor & Zafman

[57] ABSTRACT

A method for protecting digital content from copying and/or other misuse as it is transferred between devices over insecure links, includes authenticating that both a content source and a content sink are compliant devices, establishing a secure control channel between the content source and the content sink, establishing a secure content channel, providing content keys, and transferring content.

In a further aspect of the present invention, at least one certificate revocation list version identifier is exchanged between the content source and the content sink, and if the received certificate revocation list version identifier is more recent than the certificate revocation list version identifier stored in the receiving device, then the certificate revocation list of the receiving device is updated.

2 Claims, 5 Drawing Sheets

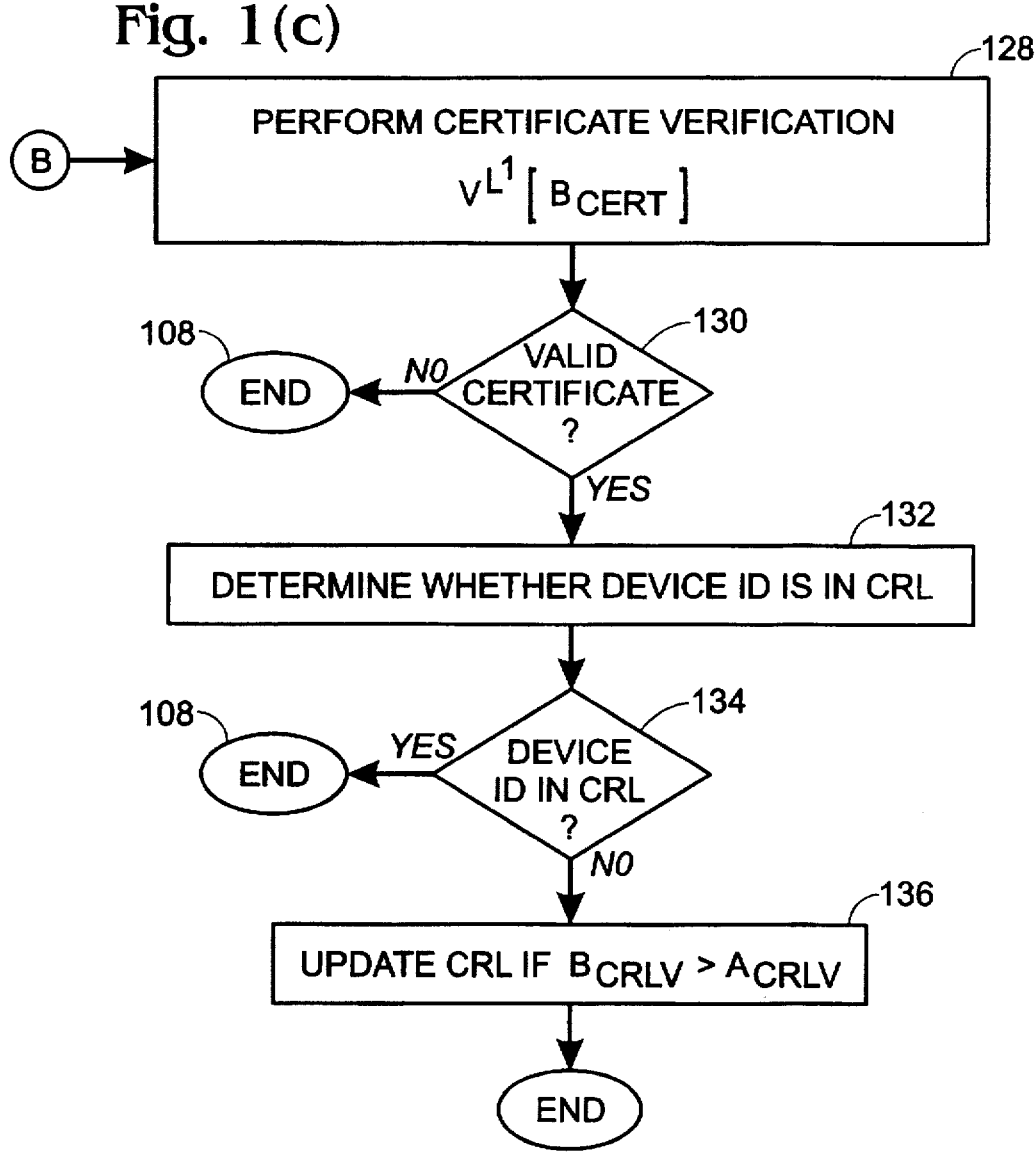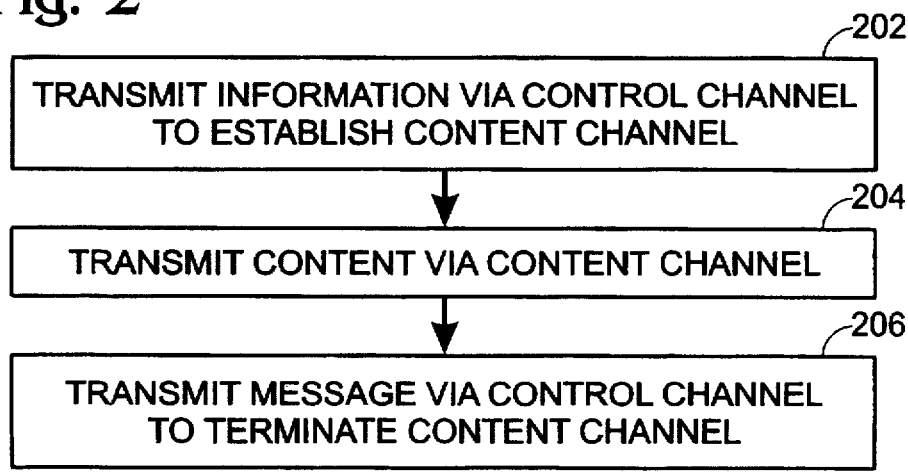

CONTENT PROTECTION FOR TRANSMISSION SYSTEMS

FIELD OF THE INVENTION

The present invention relates generally to digital content protection and more particularly to methods and apparatus for secure communication between a content source and a content sink.

BACKGROUND

Computer capabilities have increased dramatically in recent years. In addition to traditional computer applications such as word processing and spreadsheet calculations, modern personal computers (PCs) are typically capable of producing and playing multimedia presentations.

Multimedia applications may include materials such as audio, video or graphic elements that are subject to copyright or contractual restrictions as to use, distribution or the like. Typically, the multimedia content is provided in digital form for use by computers or other digital consumer electronic (CE) devices.

Many content providers are reluctant to include valuable copyrighted material for use in multimedia applications because the digital bitstream may be intercepted copied. Unlike analog materials which degrade in quality from one copy generation to the next, digital copying is capable of producing perfect copies regardless of how many generations of copies are produced.

Recent advance in storage technology, particularly digital video discs (DVD) have created the ability to store full length motion pictures on a single small disc. However, consumers are unlikely to benefit from such advances unless content providers have a mechanism to distribute digitized versions of their valuable copyrighted material in a manner that largely eliminates unauthorized copying.

What is needed is a system for protecting digital content from copying and/or other misuse as it is transferred between devices over insecure communication links.

SUMMARY OF THE INVENTION

Briefly, a method for protecting digital content from copying and/or other misuse as it is transferred between devices over insecure links, includes authenticating that both a content source and a content sink are compliant devices, establishing a secure control channel between the content source and the content sink, establishing a secure content channel, providing content keys, and transferring content.

In a further aspect of the present invention, at least one certificate revocation list version number is exchanged between the content source and the content sink, and if the received certificate revocation list version number is newer than the certificate revocation list version number stored in the receiving device, then the certificate revocation list of the receiving device is updated.

Other features and advantages of the present invention will be apparent from the drawing figures, and detailed description that follows.

BRIEF DESCRIPTION OF THE DRAWINGS

FIGS. 1(a)–(c) are flow diagrams showing an authentication process in accordance with the present invention.

FIG. 2 is a flow diagram showing establishment of a content channel in accordance with the present invention.

DETAILED DESCRIPTION

Figure 1A:
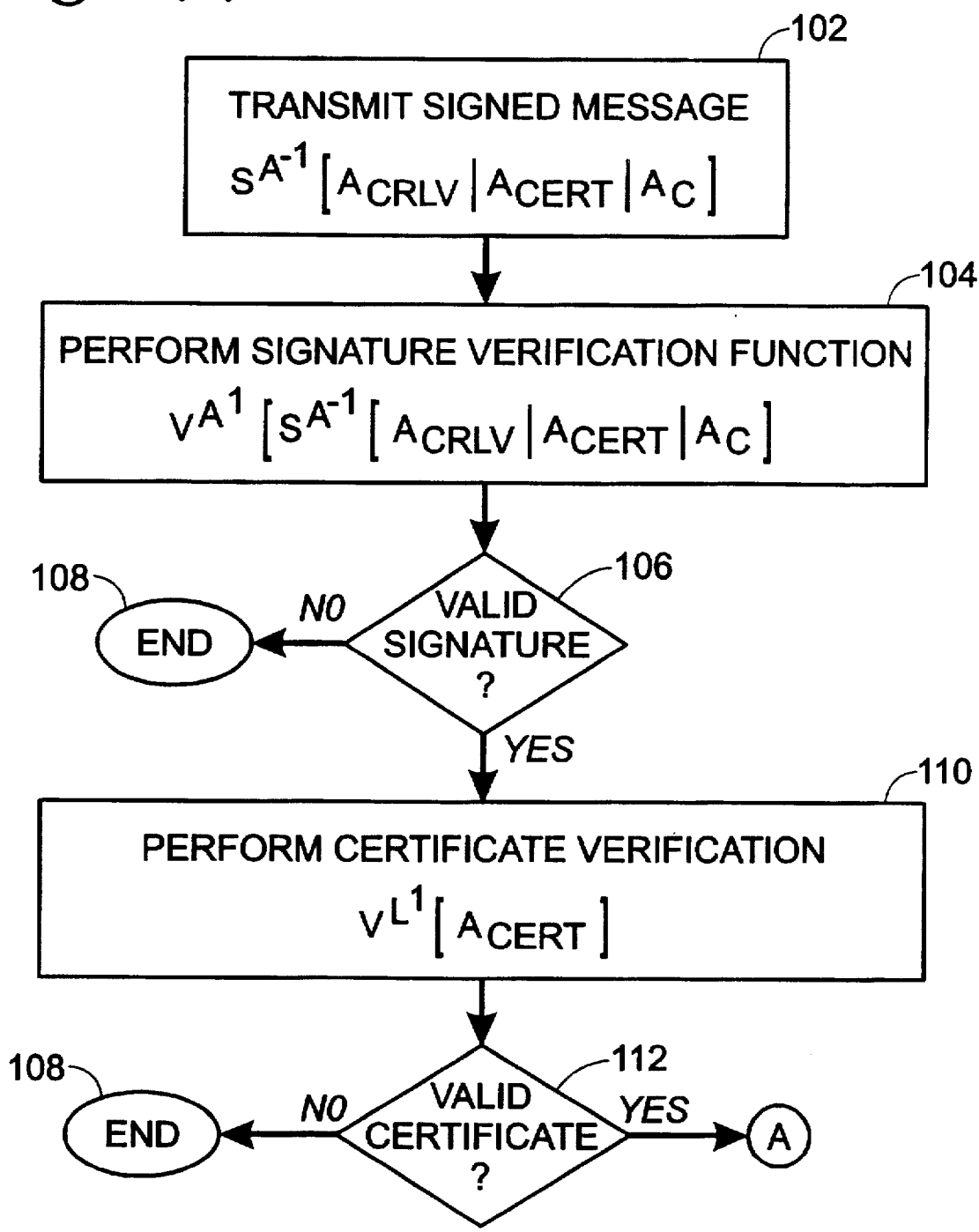

Various aspects of the present invention are described below. However, it will be understood by those skilled in the art that the present invention may be practiced with only some or all aspects of the present invention. For purposes of explanation, specific numbers, materials and configurations are set forth in order to provide a thorough understanding of the present invention. It will also be apparent to those skilled in the art that the present invention may be practiced without these specific details.

Some portions of the detailed descriptions which follow are presented in terms of algorithms and symbolic representations of operations on data bits within a computer system. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (e.g., electrical) quantities within the computer system's registers and memories into other data similarly represented as physical quantities within the computer system memories or registers or other such information storage, transmission or display devices.

TERMINOLOGY

Baseline Cipher refers to a cipher algorithm that is common all compliant devices. Examples of some well-known algorithms that may be used are DES and RC-4.

Compliant device refers to a device which is capable of securely transferring content in accordance with the present invention. Typically, the compliant device should have a digital certificate signed by a license authority, implement anti-tampering measures to reduce the likelihood that details about the private key and/or authentication and key exchange mechanisms are readily discernible or alterable, and should avoid transferring protected content unless all devices participating in the content transfer have been authenticated.

Device, as used herein, refers to both traditional consumer electronics products including but not limited to DVD player/recorders, digital televisions, set top boxes, digital satellite services receivers, and similar products, as well as applications running on one or more computers.

DES refers to the Data Encryption Standard a popular, symmetric key, standard encryption algorithm. It is a product cipher that operates on 64 bit blocks of data, using a 56 bit key. It is defined in FIPS 46-1 (1988) (which supersedes FIPS 46 (1977)). DES is identical to the ANSI standard Data Encryption Algorithm (DEA) defined in ANSI X3.92-1981.

DSA refers to the Digital Signature Algorithm specified in the DSS.

DSS refers to the Digital Signature Standard specified in FIPS 186 Digital Signature Standard, May 19, 1994, and available from NTIS FIPS refers to Federal Information Processing Standards, which are United States Government technical standards published by the National Institute of Standards and Technology. Computer-related products bought by the US Government must conform to these standards.

IEEE 1394 refers to IEEE Standard for a High Performance Serial Bus, IEEE Std 1394-1995, Institute of Electrical and Electronic Engineers, Aug. 30, 1995.

Overview

A typical embodiment of the present invention provides the ability to securely communicate, that is, transfer, protected content between devices over otherwise insecure communication links.

Embodiments of the present invention typically use strong cryptographic technologies which provide a flexible, robust solution for protecting content being exchanged across communications links such as an IEEE 1394 bus. These communication links are typically used to connect CE devices and PC based multimedia applications. Other insecure communication links that would benefit from embodiments of the present invention are those used couple storage devices, such as disk drives, to other CE devices or PCs.

Each compliant device contains a digital certificate which has been digitally signed using DSS to certify that the device is compliant. These certificates are used during the device authentication process. Compliant devices also contain a list in non-volatile memory of devices whose compliance has been revoked. This Certificate Revocation List (CRL) can be updated from other compliant devices which have a newer list or from the media on which protected content is distributed. The CRL can be used to revoke the certificates of devices whose security has been compromised.

The Diffie-Hellman key exchange protocol is used to exchange control channel encryption keys between the authenticated devices. These control channel keys are typically used with symmetric ciphers to encrypt and decrypt control messages sent between devices. The control messages establish and manage additional encrypted channels that transport protected content between devices. For both PC and CE implementations, this key exchange is typically implemented in software. Symmetric ciphers will also be used to protect these content channels. Keys for the content channel ciphers are exchanged via the control channel. The Diffie-Hellman key exchange is described in U.S. Pat. No. 4,200,770.

Control channel keys are used with symmetric ciphers to encrypt/decrypt control messages sent between devices. The control messages are used to establish and manage additional channels which transport protected content between devices. Content channels are also protected by symmetric ciphers whose keys are exchanged via the control channel. Content channels can be both point to point or multicast.

The choice of symmetric ciphers is flexible to allow a range of solutions providing varying levels of security, implementation complexity, expense, and performance. In order to ensure interoperability, all compliant devices and applications should support the Baseline Cipher.

Embodiments of the present invention do not complicate the use of CE devices or PC application software for legitimate users. All copy protection mechanisms happen transparently. When a new device is added to the system no special actions are require to renew device keys or otherwise enable the copy protection mechanisms. The authentication and key exchange mechanisms automatically handle the addition of new devices/applications and the establishment of channels between devices.

Embodiments of the present invention may be implemented in hardware or software executed by a computing device such as a microcontroller or microprocessor. Well understood cost and performance trade-offs will guide designers in making specific implementation choices. Typically, for CE devices, the authentication and key exchange mechanisms should be implemented using software running on an embedded microcontroller, and the channel ciphers should be implemented in hardware. Typically, for a PC, all components of the content protection system in accordance with the present invention may be implemented in host software. Preferably a PC that implements the present invention is protected by anti-tampering techniques.

In embodiments of the present invention, public key cryptography techniques are used to authenticate devices and exchange encryption keys. Public key cryptography uses different keys in the encryption and decryption process. To achieve better real time performance, typical embodiments of the present invention do not use public key cryptography for encoding the content. Instead, traditional high performance symmetric ciphers which can easily be implemented in hardware and software are used. Symmetric ciphers use the same key in the encryption and decryption process.

The authentication mechanism is based on the Digital Signature Standard. DSS provides a method of digitally signing and verifying the signatures of digital documents. Digital signatures allow the integrity and source of data to be verified. DSS is based on the Digital Signature Algorithm (DSA) which was developed by the U.S. Government for worldwide use. (DSA is described in U.S. Pat. No. 5,231,668.) A user of DSS generates a public/private key pair. The private key is used to sign data and must be protected to prevent the false signing of documents. The public key is freely distributed and used to verify that data has been signed by the holder of the associated private key.

A second cryptographic technology is used to distribute symmetric cipher keys. The Diffie-Hellman key exchange protocol allows two (or more) parties to generate a shared key without ever sending the key between themselves.

The algorithms for both DSS and Diffie-Hellman are public knowledge and have been subject to intensive efforts, unsuccessful thus far, to break them. From a technical perspective, the only things which must be kept secret in this system are the private keys for signing data. All other aspects of the system can be public. For greater security however, it is desirable to keep aspects of the system such as the symmetric cipher algorithm confidential.

Operation

There are four aspects to the operation of this content protection system: creation of a License Authority, manufacture of compliant systems and media, system authentication and control channel key exchange, and protected content channel encryption.

The following notation will be used in this section to describe the cryptographic processes.

| General: | $n, g$ = public constants for Diffie-Hellman key exchange |
|---|---|
| $S^{X_1}|M|$ = Sign M using DSS with private key $X^{-1}$ | Values Shared by Devices: |
| $V^{X_1}|M|$ = Verify signature of M using DSS with public key $X^1$ | $K_{Control} = Y_V^{Xk}$ mod n where $Y_V$ is the first phase Diffie-Hellman value from other 30 device = Robust Control Channel key |
| $|$ = Concatenation of fields | |
| License Authority: | $K_{content}$ = Random Content Channel key |
| $L^1, L^{-1}$ = License authority DSS public/private key pair | Algo_Select = Selected symmetric cipher algorithm |
| For Device X: | $X_{Hash}$ = SHA-1 hash of software implementation |
| $X^1, X^{-1}$ = DSS Public/private key pair | $X_{Auth\_Mask}$ = Authorization Mask |
| $X_{CRLV}$ = Current CRL version number | $X_{Cert} = S^{L^{-1}}|X_{ID}|X_{Hash}|X_{Auth\_Mask}|X^1|$ = Device Certificate |
| $X_{CRLD}$ = Current CRL device ID list | |
| $X_{CRL} = S^{L-1}|X_{CRLV}|X_{CRLD}|$ = CRL | |
| $X_{ID}$ = Identification Number | $X_V = g^{Xk}$ mod n = First phase value for the Diffie-Hellman key exchange |
| Xk = Random value for the first phase of the Diffie-Hellman key exchange | |

Cryptographic Support from the License Authority

When the License Authority is established, it must generate a public key/private key pair, $L^1$ and $L^{-1}$. These keys will be used extensively, for the lifetime of the License Authority, to sign and verify the digital certificates upon which compliant systems are based. $L^{-1}$ is the most important key in this entire cryptographic system. It must be closely held by the License Authority. In the event of disclosure, the security of the entire system would be at risk of being compromised. $L^1$ must be distributed widely to allow verification of certificates signed by the License Authority.

The License Authority is responsible for the creation of Certificate Revocation Lists (CRL). A CRL is composed of two parts, a list (CRLD) of device IDs whose compliance with the conditions of the license have been violated and detected by the License Authority, and a monotonicly increasing version identifier (CRLV). These contents are signed by the License Authority, $S^{L-1}|CRLV|CRLD|$, to ensure authenticity. If the list, CRLD, becomes unwieldly because of its size, then the list may be compressed. The trade-off to be considered by a designer is the additional computation needed to decompress the data.

Finally, the License Authority must also create the constants n and g required for the Diffie-Hellman key exchange protocol. It is not necessary to maintain the secrecy of these values. All compliant systems will need them to perform the key exchange protocol.

Compliant Systems

All compliant systems should generate during manufacture a public/private key pair $(X^1, X^{-1})$ using the defined key generation mechanism described above. $X^{-1}$ must be stored within the system in such a way as to reduce, to the extent possible, the likelihood of its disclosure. Typically, CE devices use hardware based anti-tampering techniques, and PCs use software mechanisms, often available in the operating system, to achieve tamper-resistance. If $X^{-1}$ is disclosed, or the integrity of the implementation is compromised, and the License Authority is able to detect this, then $X_{ID}$ may be added to the CRL distributed on future media.

The manufacturer should demonstrate that the system is compliant with the terms of the license. If successful, the License Authority will create a digital certificate for the system. This certificate ($X_{Cert}$) consists of the unique device ID($X_{ID}$), an SHA-1 (Secure Hash Algorithm-1) hash of the implementation software ($X_{Hash}$), an authorization mask ($X_{Auth\_Mask}$) that specifies the channel encryption algorithms supported by the system, and the device's public key ($X^1$). These values are signed by the License Authority resulting in $X_{Cert}=S^{L^{-1}}|X_{ID}|X_{hash}|X_{Auth\_Mask}|X^1|$. This certificate is stored by the compliant system and used in the authentication process. In addition, all compliant system must know $L^1$. One way to ensure uniqueness if device IDs is to have them assigned by the License Authority.

SHA-1 (Secure Hash Algorithm-1) is the part of the DSA which is used to generate a message digest. A message digest is an unique value associated with a message. It is similar in concept to a checksum, but significantly harder to forge. SHA can also be used to generate a message digest for the code used to implement the authentication and key exchange mechanisms. If the code is tampered with, $X_{Hash}$ in the device's certificate will not match the value calculated over the corrupted code.

Compliant Media

Prerecorded media containing protected content can be used to distribute updated CRLs. During the media manufacturing process, an up to date copy of the CRL is stored on the media. Compliant systems reading this media can update their CRL from the media if the version number (CRLV) is more recent. The CRLV may also be referred to as a CRL version identifier. The CRLV may be numbers, letters, or other suitable marks or codes that can be perceived and compared.

System Authentication and Control Channel Key Exchange

Figure 1B:
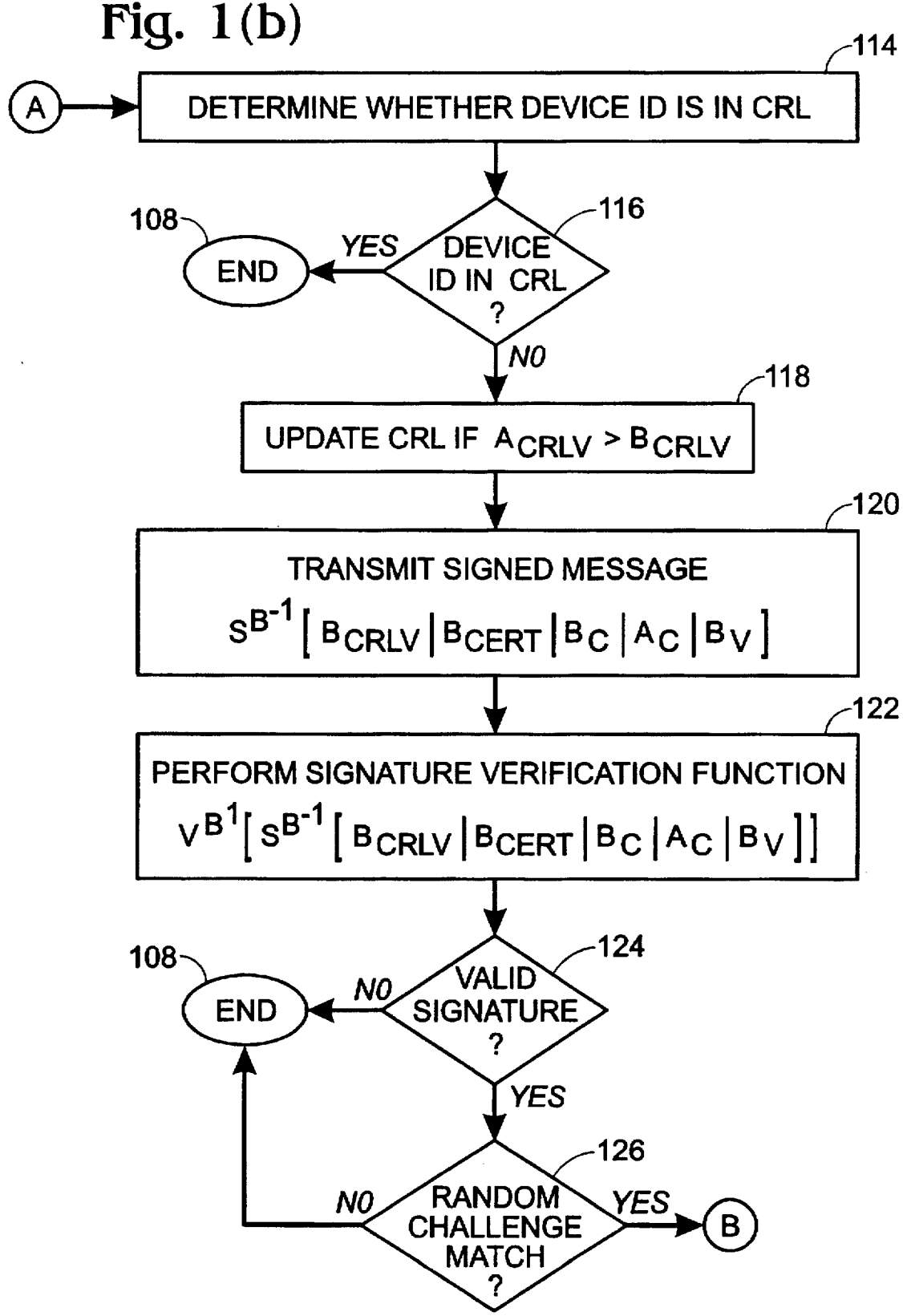

In accordance with embodiments of the present invention and as shown in FIGS. 1(a)–(c), when a compliant device is added to a communications link such as an IEEE 1394 serial bus, a cryptographic protocol is used to authenticate the devices on the bus and establish control channels between them. In this illustrative example, a compliant device ("Device A") which is a source of protected content (e.g., a DVD player) is attached to a serial bus which already has another compliant device ("Device B") which is a sink for protected content (e.g., a PC running an MPEG-2 decoder) attached to it. In this illustrative example, all messages are sent using IEEE 1394 asynchronous transactions.

As soon as Device A has been initialized, it attempts to authenticate the other devices attached to the serial bus to determine which are compliant. In this example Device A performs the protocol with Device B. In a step 102 Device A transmits a signed message, $S^{A^{-1}}|A_{CRLV}|A_{Cert}|A_C|$ to Device B which contains Device A's certificate ($A_{Cert}$), Device A's CRL version number ($A_{CRLV}$) and a random challenge ($A_C$). Those skilled in the art will recognize that variations to this protocol might include more or fewer items.

When Device B receives the message it first checks, in a step 104, the signature by computing $V^{A^1}|S^{A^{-1}}|A_{CRLV}|A_{Cert}|A_C|$ with A's public key ($A^{-1}$ from $A_{Cert}$) to verify that the message has not been tampered with. If the signature cannot be verified, Device B in a step 108 refuses to continue. Typically, a time-out condition will be detected and the devices will recognize that the current communication session has been terminated. However, as those skilled in the art will recognize, any appropriate handshaking protocol can be used to terminate the communication session. If the signature is valid, the next step 110 is to verify A's certificate by computing $V^{L^1}|A_{Cert}|$. If the License Authority signature is not valid, Device A does not have a valid certificate, and thus is not a compliant system. If the signature is valid, then in a step 114 Device B checks to see if $A_{ID}$ (in $A_{Cert}$) has been revoked by searching its CRL ($B_{CRLD}$). If $A_{ID}$ is on the list, then Device B considers Device A a non-compliant system and in a step 108 refuses to continue. Also, in a step 118 Device B checks to see if the Device A has a more recent CRL by comparing $A_{CRLV}$ to $B_{CRLV}$. and if $A_{CRLV} > B_{CRLV}$ then the CRL update procedure is performed following the completion of the authentication and key exchange process.

If no errors are encountered, then in a step 120 Device B sends a signed message, $S^{B^{-1}}|B_{CRLV}|B_{Cert}|B_C|A_C|B_V|$ to Device A which contains the following elements: Device B's certificate ($B_{cert}$), Device B's certificate revocation list version number($B_{CRLV}$), a random challenge ($B_C$), the random challenge from Device A ($A_C$), and the Diffie-Hellman key exchange first phase value from Device B ($B_V$).

On receipt of this message, in a step 122 Device A checks the signature by computing $V^{B^1}|S^{B^{-1}}|B_{CRLV}|B_{Cert}|B_C|A_C|B_V||$ to verify that the message has not been tampered with ($B^1$ is in $B_{Cert}$). If, in a step 124, the signature cannot be verified, Device A refuses to continue. If the signature is valid, the next step 126 is to compare the value of $A_C$ returned by Device B to the value which was originally sent out. If these value do not match, then Device B did not answer the random challenge correctly. If the values match, then Device A verifies Device B's certificate by computing $V^{L^1}|B_{Cert}|$ in a step 128. If the License Authority signature is not valid, Device B does not have a valid certificate and thus is not a compliant system. If the signature is valid, Device A, in a step 132 checks to see if $B_{ID}$ (in $B_{Cert}$) has been revoked by searching its CRL ($A_{CRLD}$). If $B_{ID}$ is on the list, Device A considers Device B to be a non-compliant system and in a step 108 refuses to continue. Also, in a step 136 Device A checks to see if Device B has a more recent CRL by comparing $B_{CRLV}$ to $A_{CRLV}$. If $B_{CRLV} > A_{CRLV}$ then a CRL update procedure is performed following the completion of the authentication and key exchange process.

In embodiments of the present invention which implement more than one cipher algorithm, Device A specifies which channel encryption algorithm will be used to protect the Control Channel. $B_{Auth\_Mask}$ (found in $B_{Cert}$) is compared with $A_{Auth\_Mask}$ to select the strongest encryption algorithm which is mutually supported. Algo_Select is set to the appropriate value. A signed message $S^{A^{-1}}|B_C|Algo\_Select|A_V|$ is then transmitted to Device B, where $B_C$ is the value of the random challenge from Device B. Algo_Select is the control channel encryption algorithm to be used, and $A_V$ is the Diffie-Hellman key exchange first phase value from Device A.

When this message arrives, Device B first verifies the signature by computing $V^{A^{-1}}|S^{A^{-1}}|B_C|Algo\_Select|A_V||$. If the signature is valid, Device B compares the value of $B_C$ in the message to the value which it originally sent out. If these two values are the same, then Device B has authenticated Device A. Otherwise, Device B aborts the protocol and assumes that Device A is a non-compliant device.

If no errors have occurred up to this point, the two devices have authenticated each other. They have also agreed upon a control channel cipher key and algorithm. In addition, by calculating $B_V^{Ak}$ mod n and $A_V^{Bk}$ mod n for Devices A and B respectively, a common key $K_{Control}$ ($g^{AkBk}$ mod n) for the control channel is established. This control channel remains available as long as both devices remain attached to the serial bus. This control channel is then used to set up and manage the security of protected content streams without further computationally intensive device authentication and Diffie-Hellman key exchanges.

Content Channel Encryption

To establish a channel for protected content, the following procedure, as shown in FIG. 2, is used. The source of the content, in a step 202, sends a message, via the previously established control channel, to a compliant destination device (or devices in the case of a content multicast). This message contains the following elements: a randomly generated key which is unique for each stream of content ($K_{content}$), identification of the symmetric cipher to be used (Algo_Select), and the isochronous channel associated with the content stream.

If additional compliant devices desire to receive content which is already being transmitted, those devices can request receipt of the values described above via the control channel. A separate control channel is created between each source and destination.

The protected content is transmitted in a step 204. When the source has completed the transmission of the protected content it sends a message, in a step 206 to the destination(s) asynchronously via the control channel(s) which terminates the content channel.

Since most content is real time in nature, it is preferable to use isochronous transfers when using the IEEE 1394 serial bus. This content protection system, however, can also be used to protect non-real time content transferred asynchronously.

Compliant System Components

Figure 3:
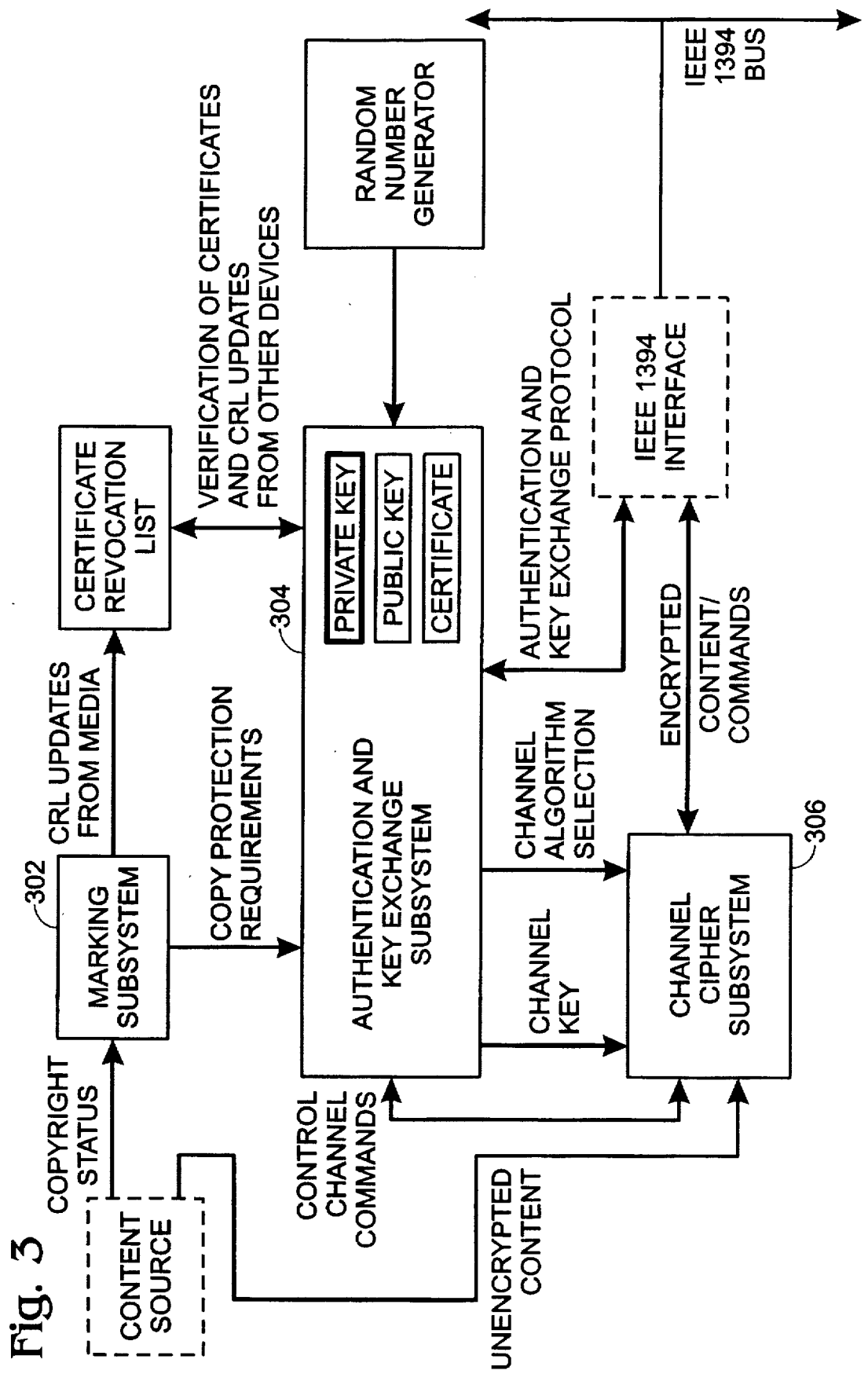
FIG. 3 is a block diagram showing a content source in accordance with the present invention.
Figure 4:
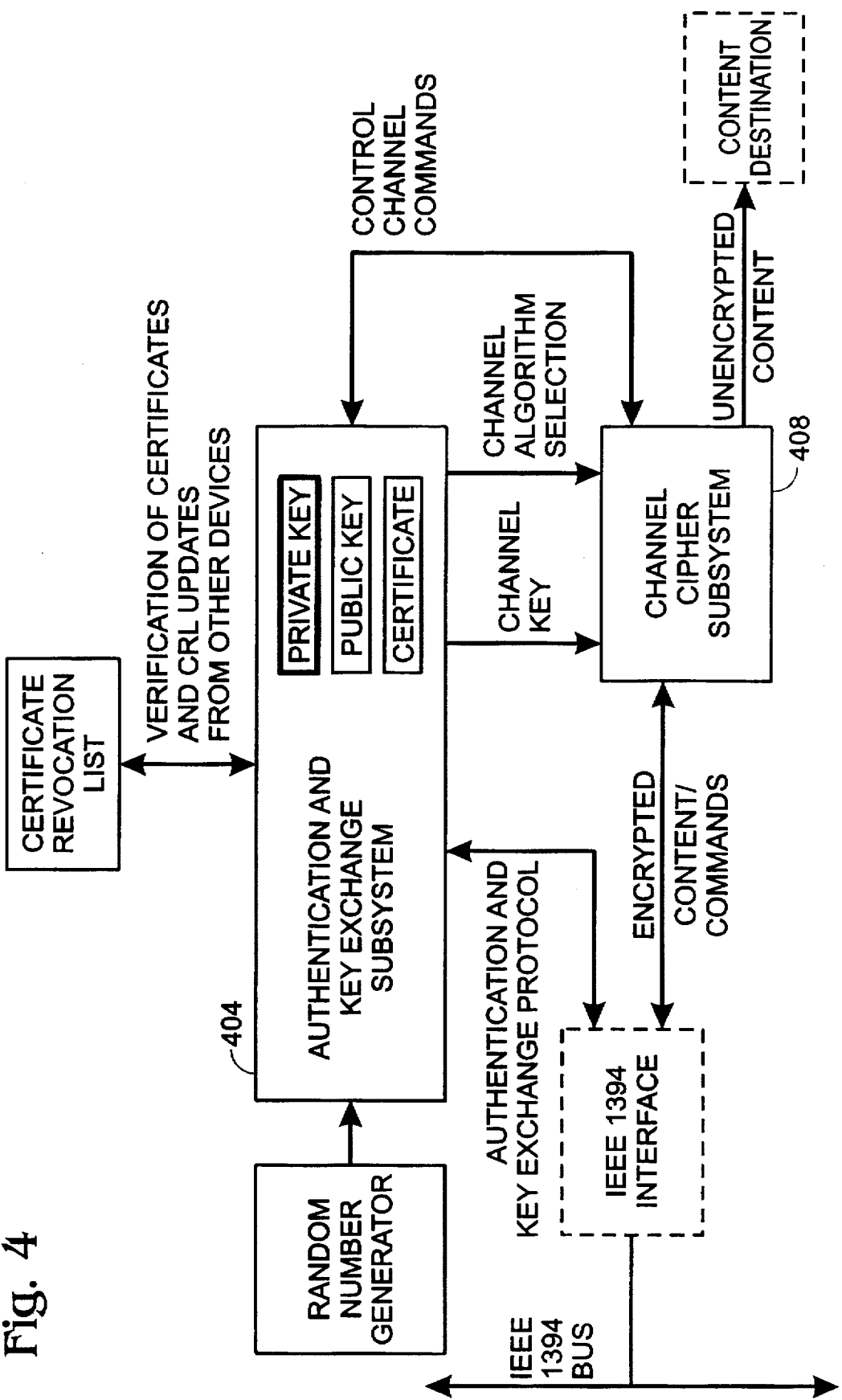
FIG. 4 is a block diagram showing a content sink in accordance with the present invention.

A compliant system must implement the components described in the following sections. FIG. 3 shows the components required for a device which is a source of protected content. FIG. 4 shows the components for a receiver of protected content. In both FIGS. 3 and 4, the subsystems in boxes with solid outlines are required for compliance. Boxes with dashed outlines are subsystems which are common to compliant and non-compliant devices.

Marking Subsystem

A Marking Subsystem 302 shown in FIG. 3 is present in systems which are sources of protected content. The primary function is to determine the protection status of the content which is to be transferred across the serial bus. This status is then translated into protection requirements which are passed to an Authentication and Key Exchange Subsystem 304. A secondary function is to update the CRL stored in the device if the content has a newer CRL.

Updating Device CRL from Prerecorded Content Media

This procedure applies to devices which can read prerecorded, protected content from removable media. Prerecorded, protected media, in accordance with the present invention, contains a Certificate Revocation List which is current as of the time the media is manufactured. When a device loads new, prerecorded media, it examines the version number of the CRL stored on the media. If this value is greater than that of the device's current CRL, the device uses the following steps to update its CRL:

1. Read the CRL from the Media
2. Verify the signature of CRL with the License Authority's public key.
3. If the signature is valid, store the newer CRL in the device's non-volatile storage.

Authentication and Key Exchange Subsystem

As shown in FIGS. 3 and 4 an Authentication and Key Exchange Subsystem 304, 404 is found in both Senders and Receivers of protected content. Authentication and Key Exchange Subsystem 304, 404 is responsible for implementing the protocols which are used to ensure that devices exchanging protected content are compliant. The protocol is also used to select a channel encryption algorithm and exchange the control channel encryption key.

Updating the CRL from a Remote Device

If during device authentication a more recent CRL is discovered on another device the following procedure is used to update the local CRL:

1. Read the CRL from the remote device
2. Verify the signature of CRL with the License Authority's public key.
3. If the signature is valid, store the newer CRL in the device's non-volatile storage.

This procedure should take place following the completion of authentication and key exchange. Since updating the CRL is not a time critical activity, it can be done in the background. In this way impact on normal device operation is typically small.

Channel Encryption Subsystem

A compliant device that transmits protected content must have a Channel Encryption Subsystem 306. Control messages, as well as protected content, are encrypted prior to transmission. Channel Encryption Subsystem 306 performs these encryptions. The keys used to encrypt the content and commands are passed to Channel Encryption Subsystem 306 from Authentication and Key Exchange Subsystem 304. Channel Encryption Subsystem 306 may support more than one cipher, although for interoperability it is preferable that a Baseline Cipher be supported. In a typical embodiment of the present invention, Authentication and Key Exchange Subsystem 304 specifies the particular cipher and key to be used for each packet transmitted.

Channel Decryption Subsystem

A compliant device which receives protected content must have a Channel Decryption Subsystem 408. Channel Decryption Subsystem 408 decrypts control messages and protected content which are received from the serial bus. The keys used to decrypt the content and commands are passed to Channel Decryption Subsystem 408 from Authentication and Key Exchange Subsystem 404. Channel Decryption Subsystem 408 may support more than one cipher, although for interoperability it is preferable that a Baseline Cipher be supported. Authentication and Key Exchange Subsystem 404 specifies the particular cipher and key to be used for each packet received.

Baseline Cipher

A Baseline Cipher must be supported by Channel Encryption Subsystem 306 and Channel Decryption Subsystem 408 of all compliant devices. This baseline cipher is required to ensure the interoperability of all compliant devices. Additional ciphers with other properties such as increased security can also be deployed and used, provided that both the source and destination devices support it. Those skilled in the art will recognize that many symmetric key ciphers, for example DES, are available to for use as a baseline cipher.

Channel Encryption Performance

In order to support content transfer of an MPEG-2 compressed video stream, the encryption cipher implementation should be able to deliver at least approximately 12 Mbps. For PCs, this cipher is typically implemented in software. For CE devices, it is typically implemented in hardware.

Key Generation at Device Manufacture

Ideally, each device manufactured will have a unique device ID and public/private DSS key pair. With unique device IDs and DSS keys, the License Authority will only need to revoke the certificates of the specific devices which have been compromised. Other users who bought the same device model and have not violated the license agreement would not be effected by this revocation. The principle drawback of this scheme may be that the manufacture of CE devices is made more complicated. This would be the case if no information unique to each copy of the device (such as a serial number) is currently programmed into it.

Certificate Revocation List Storage and Size

Certificate Revocation Lists are straightforward to implement and use as long as CE devices have sufficient non-volatile, reprogrammable storage in which to keep the list. PC implementations do not have this problem as the CRL can be stored on disk. Unless the lists remain relatively short, a direct representation may become unwieldy. Techniques are available to generate more compact representations of the list, but they require more computation to search.

Key Generation

It will be apparent to those skilled in the art that with respect to DSS key generation, various key generation procedures and key lengths are possible. Selection of specific key generation procedures and key lengths should be chosen in view of the performance of the underlying platform. Typically, key lengths of from 512 to 1024 bits may be used, however, as readily understood by those skilled in the art, there is a trade-off between the increased security provided by longer keys, and the increased time that it takes to sign and verify with a longer key.

With respect to the generation of keys for the Diffie-Hellman protocol, the properties of the constants g and n should be as follows:

g is primitive mod n (Choose the smallest g possible)

n is large prime $(n-1)/2$ must also be prime where g is primitive with respect to p is for each b from 1 to n, there exists some a where $g^a$ is congruent to b (mod p).

The security of the key exchange is based on the size of n. At a minimum, n must be larger than the channel key size. The actual size is chosen by a system designer in view of the capabilities of the underlying platform, particularly in terms of the time required and the latency that might be seen by an end user of the system.

Depending on the strength of the channel ciphers, it may be necessary to change both control and content cipher keys on a regular basis. Control channel keys are preferably renegotiated using the Diffie-Hellman protocol. New content channel keys can be distributed via the control channel. These key changes would typically be a relatively low priority (as compared to delivery of real-time audio and video for example) activity, typically performed in the background and therefore unlikely to adversely affect overall system performance.

Conclusion

Embodiments of the present invention provide a flexible system which can support a range of protection levels. Digital certificates enable device authentication which excludes the use of devices which can circumvent the protection of the content. Furthermore, the content itself will be encrypted to ensure that even if it is copied, it will be in an unusable format. In typical embodiments of the present invention, the keys used to protect the content are exchanged using the Diffie-Hellman key exchange protocol. The present invention allows for a high level of content protection which can be implemented with a reasonable level of resources for consumer electronics equipment and computer systems.

Embodiments of the present invention advantageously provide strong protection of audio/video content transmitted over communications links such as an IEEE 1394 buss.

A further advantage of the present invention is that non-compliant devices are unable to transmit or receive protected content. Define a system which works well for PCs and consumer electronics (CE) devices.

A still further advantage of the present invention is that it is inexpensive to implement in PCs and other consumer electronic devices.

It will be understood by those skilled in the art that many design choices are possible within the scope of the present invention. The present invention is not limited to communication via a bit serial link, nor is it limited to a particular cryptographic algorithm or key length. For example, although an illustrative embodiment of the present invention is described as using an IEEE 1394 serial bus, the present invention is equally applicable to other interconnect technologies such as Ethernet, Asynchronous Transfer Mode (ATM), cable television systems, and telephony networks. Further cryptographic algorithms chosen for the content and control channels may be different.

The present invention can be embodied as methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The program code encoded in tangible media creates the means for causing the computer to perform the various steps of the present invention. The present invention can also be embodied in the form of computer program code, whether stored in a storage medium loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code combines with the microprocessor to provide a unique device that operates analogously to specific circuits.

It will be understood that various changes in the details, materials, and arrangements of the parts and steps which have been described and illustrated in order to explain the nature of this invention may be made by those skilled in the art without departing from the principles and scope of the invention as expressed in the subjoined claims.

What is claimed is:

1. A method of distributing protected content, the method comprising the steps of:

a) authenticating a content sink by a content source;

b) authenticating a content source by a content sink;

c) establishing a secure control channel;

d) comparing the relative creation dates of at least two certificate revocation lists;

e) establishing a secure content channel; and f) transferring content from content source to content sink.

2. The method of claim 1, wherein the step of establishing a secure control channel comprises the step of performing a Diffie-Hellman key exchange.

* * * * *